United States Patent
Li et al.

(10) Patent No.: US 11,902,095 B2
(45) Date of Patent: Feb. 13, 2024

(54) CLUSTER QUORUM METHOD AND APPARATUS, ELECTRONIC DEVICE, AND READABLE STORAGE MEDIUM

(71) Applicant: Inspur Suzhou Intelligent Technology Co., Ltd., Suzhou (CN)

(72) Inventors: Hui Li, Jinan (CN); Peng Zhao, Jinan (CN)

(73) Assignee: INSPUR SUZHOU INTELLIGENT TECHNOLOGY CO., LTD., Suzhou (CN)

( * ) Notice: Subject to any disclaimer, the term of this patent is extended or adjusted under 35 U.S.C. 154(b) by 0 days.

(21) Appl. No.: 18/034,554

(22) PCT Filed: Sep. 28, 2021

(86) PCT No.: PCT/CN2021/121209
§ 371 (c)(1),
(2) Date: Apr. 28, 2023

(87) PCT Pub. No.: WO2022/116661
PCT Pub. Date: Jun. 9, 2022

(65) Prior Publication Data
US 2023/0396501 A1    Dec. 7, 2023

(30) Foreign Application Priority Data
Dec. 2, 2020   (CN) .......................... 202011391793.6

(51) Int. Cl.
*H04L 41/0893*    (2022.01)
*H04L 41/12*    (2022.01)
(Continued)

(52) U.S. Cl.
CPC .......... *H04L 41/0893* (2013.01); *H04L 41/12* (2013.01); *G06F 11/1425* (2013.01);
(Continued)

(58) Field of Classification Search
CPC . H04L 41/0893; H04L 41/12; H04L 67/1097; H04L 45/46; H04L 67/10; G06F 11/1425; G06F 11/187; G06F 11/0709
See application file for complete search history.

(56) References Cited

U.S. PATENT DOCUMENTS

| | | | |
|---|---|---|---|
| 7,478,263 | B1 | 1/2009 | Kownacki et al. |
| 8,024,432 | B1 | 9/2011 | Sharma et al. |

(Continued)

FOREIGN PATENT DOCUMENTS

| | | |
|---|---|---|
| CN | 1243611 | 2/2000 |
| CN | 102308559 | 1/2012 |

(Continued)

OTHER PUBLICATIONS

International Search Report and Written Opinion of corresponding PCT application No. PCT/CN2021/121209 dated Dec. 30, 2021 including translations (16 pages).

(Continued)

*Primary Examiner* — Tom Y Chang
(74) *Attorney, Agent, or Firm* — Crowell & Morning LLP

(57) ABSTRACT

Disclosed are a cluster quorum method and apparatus, an electronic device, and a computer-readable storage medium. The method includes: acquiring a historical election set, and obtaining a first node quantity and a power condition by using the historical election set; generating a quorum parameter by using the first node quantity according to the power condition; acquiring a current network topology, and judging whether the current network topology satisfies the quorum parameter; and if the current network topology satisfies the quorum parameter, providing a cluster service. According to the method, a new network topology after a failure is not required to include the majority of nodes in an original cluster, whereby the network topology can continue to work no matter a quantity of nodes in the network topology while (Continued)

data consistency is ensured, improving viability of the cluster.

20 Claims, 2 Drawing Sheets

(51) Int. Cl.
*H04L 67/10* (2022.01)
*G06F 11/14* (2006.01)
*H04L 67/1097* (2022.01)
*G06F 11/18* (2006.01)

(52) U.S. Cl.
CPC ............ *G06F 11/187* (2013.01); *H04L 67/10* (2013.01); *H04L 67/1097* (2013.01)

(56) References Cited

U.S. PATENT DOCUMENTS

| | | | |
|---|---|---|---|
| 8,108,715 B1 | | 1/2012 | Agarwal |
| 8,578,204 B1* | | 11/2013 | Ortenberg ........... G06F 11/1425 714/4.11 |
| 11,769,592 B1* | | 9/2023 | McNair ................. G16B 20/20 702/19 |
| 2002/0152414 A1* | | 10/2002 | Barron .................... H04L 67/12 714/4.5 |
| 2012/0197822 A1 | | 8/2012 | Lee et al. |
| 2013/0080559 A1* | | 3/2013 | Rao ........................ H04L 43/10 709/208 |
| 2022/0300384 A1* | | 9/2022 | Reznik ................... G06F 11/079 |
| 2023/0113718 A1* | | 4/2023 | Khanna ............... H04L 67/1044 700/276 |
| 2023/0298138 A1* | | 9/2023 | George ............ G06V 30/19147 382/128 |

FOREIGN PATENT DOCUMENTS

| | | |
|---|---|---|
| CN | 102402395 | 4/2012 |
| CN | 104378232 | 2/2015 |
| CN | 105934929 | 9/2016 |
| CN | 106789193 | 5/2017 |
| CN | 106953914 | 7/2017 |
| CN | 109257195 | 1/2019 |
| CN | 109491615 | 3/2019 |
| CN | 109729129 | 5/2019 |
| CN | 110597664 | 12/2019 |
| CN | 111654402 | 9/2020 |
| CN | 111694694 | 9/2020 |
| CN | 112468596 | 3/2021 |
| WO | 2016107172 | 7/2016 |
| WO | 2019085875 | 5/2019 |

OTHER PUBLICATIONS

Search report of corresponding CN priority application No. CN202011391793.6 dated May 12, 2022 (3 pages).

Zhang, Yu et al., Study on the Cluster Membership Quorum of Veritas Cluster Server and Data Protection,(Digital Technology & Application),Dec. 31, 2011, pp. 84-85 with English abstract (3 pages).

* cited by examiner

CLUSTER QUORUM METHOD AND APPARATUS, ELECTRONIC DEVICE, AND READABLE STORAGE MEDIUM

This application is the national phase application of International Application No. PCT/CN2021/121209, filed Sep. 28, 2021, which claims priority to Chinese Patent Application No. 202011391793.6, filed on Dec. 2, 2020 in China National Intellectual Property Administration and entitled "Cluster Quorum Method and Apparatus, Electronic Device, and Readable Storage Medium", the contents of each of which are hereby incorporated by reference in their entirety.

FIELD

The present application relates to the field of cluster technologies, and in particular, to a cluster quorum method, a cluster quorum apparatus, an electronic device, and a computer-readable storage medium.

BACKGROUND

When a distributed cluster works, a cluster node may fail, or network communication between cluster nodes may be interrupted, resulting in a loss or splitting of a cluster topology. If the topology loss occurs, and a node remaining in the topology does not take over a cluster function, the cluster will stop. If the topology splitting occurs, and each portion after splitting attempts to take over the cluster, because the portions cannot communicate with each other, status consistency may be broken. In order to solve the foregoing problem, a majority quorum mode is used in the related art. That is, when the foregoing two failures occur on the cluster, network topology acknowledgment is performed. If a corresponding topologically connected component includes more than a half of nodes, the corresponding component takes over the cluster, and another node on another component leaves the cluster. However, the related art has a great limitation. In many cases in which remaining nodes can continue to externally provide services as a cluster, the services cannot be provided only because a quantity of the remaining nodes is less than a half. As a result, viability of the cluster is poor.

Therefore, how to solve the problem of poor viability of a cluster in the related art is a technical problem those skilled in the art need to solve.

SUMMARY

In view of this, an objective of the present application is to provide a cluster quorum method, a cluster quorum apparatus, an electronic device, and a computer-readable storage medium. Therefore, a network topology can continue to work no matter a quantity of nodes in the network topology, improving viability of a cluster.

In order to solve the foregoing technical problem, the present application provides a cluster quorum method, including:
acquiring a historical election set, and obtaining a first node quantity and a power condition by using the historical election set;
generating a quorum parameter by using the first node quantity according to the power condition;
acquiring a current network topology, and judging whether the current network topology satisfies the quorum parameter; and
if the current network topology satisfies the quorum parameter, providing a cluster service.

In some embodiments, the obtaining a first node quantity and a power condition by using the historical election set includes:
collecting statistics on a first authorized node in the historical election set to obtain the first node quantity;
acquiring power information corresponding to each first authorized node, and judging whether all first authorized nodes are powered by a single power supply; and
if all the first authorized nodes are powered by the single power supply, determining the power condition to be single powering; or
if not all the first authorized nodes are powered by the single power supply, determining the power condition to be a maximum single powered node quantity, the maximum single powered node quantity being greater than a half of the first node quantity.

In some embodiments, the generating a quorum parameter by using the first node quantity according to the power condition includes:
if the power condition is single powering, generating a quorum threshold by using the first node quantity according to a parity condition of the first node quantity; or
if the power condition is the maximum single powered node quantity, generating a quorum threshold by using the maximum single powered node quantity and the first node quantity according to a quorum disk condition of the historical election set; and
generating the quorum parameter by using the quorum threshold.

In some embodiments, the generating a quorum threshold by using the first node quantity according to a parity condition of the first node quantity includes:
if the first node quantity is odd, adding 1 to the first node quantity, and dividing a result by 2 to obtain the quorum threshold; or
if the first node quantity is even, judging whether there is a quorum disk in the historical election set, and
if there is the quorum disk in the historical election set, dividing the first node quantity by 2 to obtain the quorum threshold, or
if there is not the quorum disk in the historical election set, dividing the first node quantity by 2, and adding 1 to a result to obtain the quorum threshold.

In some embodiments, the generating a quorum threshold by using the maximum single powered node quantity and the first node quantity according to a quorum disk condition of the historical election set includes:
if there is a quorum disk in the historical election set, subtracting the maximum single powered node quantity from the first node quantity to obtain the quorum threshold; or
if there is not a quorum disk in the historical election set, subtracting the maximum single powered node quantity from the first node quantity, and adding 1 to a result to obtain the quorum threshold.

In some embodiments, the judging whether the current network topology satisfies the quorum parameter includes:
judging whether a second authorized node quantity corresponding to the current network topology is less than the quorum threshold; and
if the second authorized node quantity corresponding to the current network topology is less than the quorum threshold, determining that the quorum parameter is not satisfied; or if the second authorized node quantity corresponding to the current network topology is not less than the quorum threshold, judging whether the historical election set is a target election set, the target election set being an election set with more than one power supply and the quorum disk or an election set with one power supply, an even quantity of first authorized nodes, and the quorum disk, if the historical election set is not the target election set, determining that the quorum parameter is satisfied, or if the historical election set is the target election set, judging whether the second authorized node quantity is equal to the quorum parameter, and if the second authorized node quantity is not equal to the quorum threshold, determining that the quorum parameter is satisfied, or if the second authorized node quantity is equal to the quorum threshold, judging, by using a current quorum disk condition of the current network topology, whether the quorum parameter is satisfied.

In some embodiments, the judging, by using a current quorum disk condition of the current network topology, whether the quorum parameter is satisfied includes:

if the current network topology recognizes the quorum disk, contending for the quorum disk, and determining, after successful contention, that the quorum parameter is satisfied; or if the current network topology does not recognize the quorum disk, judging whether there is a quorum node, and if there is the quorum node, determining that the quorum parameter is satisfied, or if there is not the quorum node, determining that the quorum parameter is not satisfied.

The present application also provides a cluster quorum apparatus, including:

an acquisition module, configured to acquire a historical election set, and obtain a first node quantity and a power condition by using the historical election set;

a generation module, configured to generate a quorum parameter by using the first node quantity according to the power condition;

a judgment module, configured to acquire a current network topology, and judge whether the current network topology satisfies the quorum parameter; and a service module, configured, if the current network topology satisfies the quorum parameter, to provide a cluster service.

The present application also provides an electronic device, including a memory and a processor.

The memory is configured to store a computer program.

The processor is configured to execute the computer program to implement the foregoing cluster quorum method.

The present application also provides a computer-readable storage medium, configured to store a computer program. The computer program is executed by a processor to implement the foregoing cluster quorum method.

According to the cluster quorum method provided in the present application, the historical election set is acquired, and the first node quantity and the power condition are obtained by using the historical election set. The quorum parameter is generated by using the first node quantity according to the power condition. The current network topology is acquired, and whether the current network topology satisfies the quorum parameter is judged. If the current network topology satisfies the quorum parameter, the cluster service is provided.

Thus, it can be seen that, in the method, after a splitting or loss failure occurs on a network topology of a cluster, a first node quantity and a power condition that correspond to a historical election set before the splitting or loss failure are acquired, and quorum is performed by using the first node quantity and power condition to judge whether a network topology after the failure can continue to provide services as a cluster. Specifically, a quorum parameter is generated by using the first node quantity. A quantity of nodes in the network topology after the failure may be limited based on an original quantity of nodes, to ensure that there is and is only one new network topology capable of externally providing services as a cluster if network topology splitting occurs and prevent data inconsistency caused by the fact that two clusters externally provide services at the same time. In addition, it can be ensured that when there is only one network topology after the topology loss occurs, nodes in the network topology can externally provide services as a new cluster. After the quorum parameter is obtained, whether the current network topology satisfies the quorum parameter is judged. If the current network topology satisfies the quorum parameter, a cluster service can be externally provided, such that the cluster continues to work. According to the method, the new network topology after the failure is not required to include the majority of nodes in the original cluster, whereby the network topology can continue to work no matter a quantity of nodes in the network topology while data consistency is ensured, improving viability of the cluster.

In addition, the present application also provides the cluster quorum apparatus, the electronic device, and the computer-readable storage medium, which have the foregoing beneficial effects.

BRIEF DESCRIPTION OF THE DRAWINGS

In order to describe the technical solutions in embodiments of the present application or the related art more clearly, the drawings required to be used in descriptions about the embodiments or the related art will be described briefly below. Apparently, the drawings in the description below are merely the embodiments of the present application. Those ordinarily skilled in the art may further obtain other drawings according to the provided drawings without creative work.

DETAILED DESCRIPTION

In order to make the objective, the technical solutions, and the advantages of the embodiments of the present application clearer, the technical solutions in the embodiments of the present application will be described clearly and completely below with reference to the drawings in the embodiments of the present application. Clearly, the described embodiments are not all but some embodiments of the present application. All other embodiments obtained by those ordinarily skilled in the art based on the embodiments in the present application without creative work shall fall within the protection scope of the present application.

Figure 1:
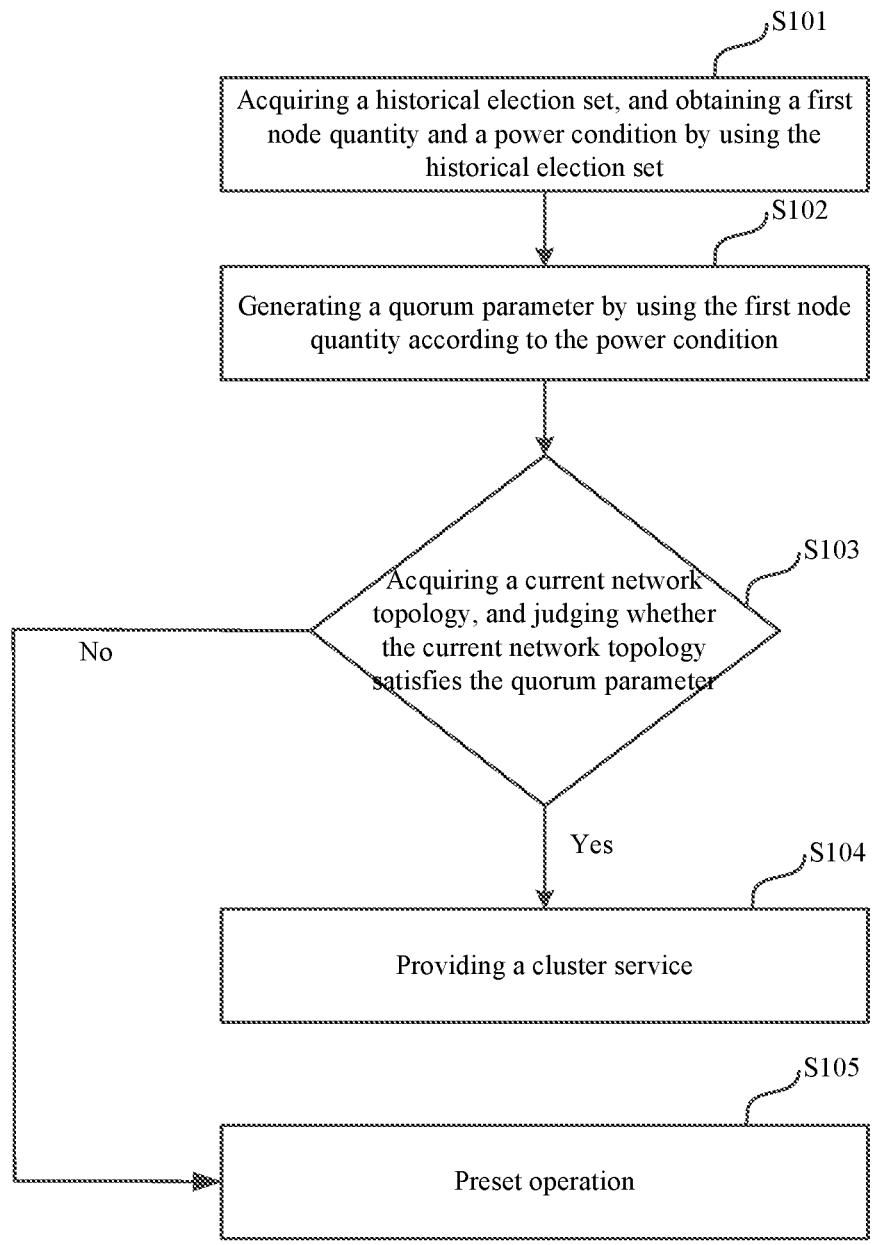
FIG. 1 is a flowchart of a cluster quorum method according to an embodiment of the present application.

Refer to FIG. 1. FIG. 1 is a flowchart of a cluster quorum method according to an embodiment of the present application. The method includes the following steps.

S101: Acquiring a historical election set, and obtaining a first node quantity and a power condition by using the historical election set.

It is to be noted that all or some steps in the cluster quorum method provided in the present embodiment may be performed by a specified node in a current network topology. The node may be any node in the current network topology, for example, a node with a minimum number, a node with a maximum number, or a node with a minimum network address. Specifically, in case of network topology splitting or loss, that is, in case of topology splitting caused by interruption of network communication between some nodes and other nodes in an original cluster, or in case of shutdown or power failure of some nodes, each node may broadcast its own number or Internet Protocol (IP) address in the current network topology, judges whether it is the specified node, for example, the node with the minimum number, after acquiring numbers or IP addresses of all nodes, and if it is the specified node, perform all or some steps in the cluster quorum method.

The historical election set is a set including an authorized node in the cluster when the cluster provides services as a cluster before the network failure. The authorized node is a node whose cluster status is new enough, and may participate in cluster voting or provide the service, for example, vote for a quorum about whether to continue to externally provide the service as a cluster, or perform other voting. The quantity of authorized nodes is not limited. A node whose status is not new enough may not serve as an authorized node and vote, and may become an authorized node after the cluster status is updated. The historical election set may be stored on each node in the cluster or on each authorized node. The historical election set is acquired, so that a cluster topology before the failure may be determined, a corresponding quorum parameter may further be generated based on the cluster topology, and quorum about whether the cluster topology can continue to provide the service as a cluster may be performed by using the quorum parameter.

The first node quantity is a quantity of first authorized nodes in the historical election set, whose specific value is not limited. The power condition is a powering condition of each first authorized node in the historical election set. It is to be note that the first authorized nodes may be all powered by a single power supply, or may be powered by a plurality of power supplies. Based on this, the present embodiment provides a specific method for acquiring the first node quantity and the power condition. The step of obtaining a first node quantity and a power condition by using the historical election set may include the following steps.

Step 11: Collecting statistics on a first authorized node in the historical election set to obtain the first node quantity.

Step 12: Acquiring power information corresponding to each first authorized node, and judging whether all first authorized nodes are powered by a single power supply.

Step 13: If all the first authorized nodes are powered by the single power supply, determining the power condition to be single powering.

Step 14: If not all the first authorized nodes are powered by the single power supply, determining the power condition to be a maximum single powered node quantity.

It is to be noted that the historical election set includes only the first authorized node. Therefore, collecting statistics on the first authorized node in the historical election set is collecting statistics on a quantity of nodes in the historical election set. When statistics on the first node quantity is collected, the power information corresponding to each first authorized node may be acquired. The power information is used for representing an identity of a power supply that powers the first authorized node, and may specifically be a power supply Identifier (ID), a power supply name, or the like. Each piece of power information is used to judge whether all the first authorized nodes are powered by the single power supply, that is, judge whether all nodes in the historical election set are powered by the single power supply. If all the nodes in the historical election set are powered by the single power supply, the power condition is determined to be single powering. If not all the nodes in the historical election set are powered by the single power supply, it indicates that the nodes in the historical election set are powered by more than two power supplies respectively, and in this case, the power condition is determined to be the maximum single powered node quantity. The maximum single powered node quantity is a maximum quantity of nodes powered by a same power supply. Since the nodes in the historical election set are powered by the more than two power supplies respectively, there is necessarily a maximum in quantities of nodes powered by each power supply, and the maximum value is the maximum single powered node quantity. It is to be noted that in the present embodiment, each first authorized node is powered by only one power supply, and the maximum single powered node quantity in the present embodiment is greater than a half of the first node quantity. A case in which the maximum single powered node quantity is not greater than a half of the first node quantity is not discussed in the present embodiment.

S102: Generating a quorum parameter by using the first node quantity according to the power condition.

After the power condition and the first node quantity are obtained, the quorum parameter may be generated by using the first node quantity according to the power condition. Specific content of the quorum parameter is not limited, and may be set as actually required. Since the topology loss may be caused by a power failure of a node, it may be understood that the topology loss has different impact under different powering conditions. The quorum parameter generated according to the power condition and the first node quantity may not only select one of two network topologies after topology splitting to externally provide services as a new cluster to prevent nodes in each of the two network topologies to form a cluster for providing services to further ensure viability of the cluster while ensuring data consistency, but also enable the current network topology after the topology loss to continue to provide services no matter a quantity of nodes, improving the viability of the cluster.

For example, in a case, a quantity of first authorized nodes in the cluster is even, and after topology splitting occurs, a quantity of authorized nodes in each of two new network topologies obtained by splitting is a half of the original quantity. In this case, services cannot be externally provided in the related art. In another case, most of first authorized nodes in the cluster are powered by the same power supply, and if a sudden power failure occurs on the power supply, it is determined in the related art that remaining nodes in the cluster are not in the majority and cannot continue to provide services. In the present application, the power condition is considered when the quorum parameter is generated, the generated quorum parameter may consider a case in which a power failure of the power supply causes a topology loss, and quorum may be accurately performed in the foregoing case or a similar case, to improve the viability of the cluster.

In a possible implementation, to ensure successful quorum in any case, the quorum parameter may include a quorum threshold, and a quantity of nodes in a topology for quorum is limited by using the quorum threshold. Specifically, the step of generating a quorum parameter by using the first node quantity according to the power condition may include the following steps.

Step 21: If the power condition is single powering, generating a quorum threshold by using the first node quantity according to a parity condition of the first node quantity.

Step 22: If the power condition is the maximum single powered node quantity, generating a quorum threshold by using the maximum single powered node quantity and the first node quantity according to a quorum disk condition of the historical election set.

Step 23: Generating the quorum parameter by using the quorum threshold.

If the power condition is single powering, the case of the topology loss may not be considered. This is because if the topology loss occurs, the whole cluster cannot work because all the first authorized nodes are powered by one power supply. Therefore, quorum is required all because topology splitting occurs. The quantity of nodes in the new topology obtained by topology splitting is related to the first node quantity. When the first node quantity is odd, the quantities of nodes in the two topologies obtained by splitting may necessarily be unequal. When the first node quantity is even, the quantity of nodes in the two topologies obtained by splitting may be equal. Therefore, the quorum threshold is required to be generated according to the parity condition of the first node quantity. If the power condition is the maximum single powered node quantity, there may be two types of failures: topology splitting and the topology loss. When quorum is performed, the quorum threshold may be generated by using the maximum powering node quantity and the first node quantity according to the quorum disk condition of the historical election set, that is, whether there is a quorum disk is judged. The quorum disk is a storage address of core data of the cluster, and may specifically be a hard disk. When there is the quorum disk, quorum may be performed by contending for the quorum disk. After the quorum threshold is obtained, the quorum parameter is generated by using the quorum threshold. A specific generation process is not limited. In addition to the quorum threshold, the quorum parameter may further include another quorum rule according to an actual situation, so as to prevent data inconsistency caused by successful quorum of both topologies.

Specifically, in a possible implementation, the step of generating a quorum threshold by using the first node quantity according to a parity condition of the first node quantity may include the following steps.

Step 31: If the first node quantity is odd, adding 1 to the first node quantity, and dividing a result by 2 to obtain the quorum threshold.

Specifically, if the first node quantity is odd, one network topology after the failure necessarily includes more nodes. Therefore, the quorum threshold may be obtained by adding 1 to the first node quantity and dividing a result by 2. In this case, the quorum threshold may be represented by $N_Q(\text{Node})$, where $$N_Q(\text{Node}) = \frac{N_e + 1}{2}.$$

$N_e$ is the first node quantity. Selecting a network topology including more nodes as a new cluster may ensuring an operation capability of the cluster while ensuring successful quorum of only one network topology.

Step 32: If the first node quantity is even, judging whether there is a quorum disk in the historical election set.

If the first node quantity is even, it indicates that the quantities of nodes in the two network topology after splitting may be the same. In this case, whether there is the quorum disk in the historical election set is required to be judged to further judge whether quorum may be performed on the new network topologies by contending for the quorum disk.

Step 33: If there is the quorum disk, dividing the first node quantity by 2 to obtain the quorum threshold.

If there is the quorum disk, it indicates that quorum may be performed by contending for the quorum disk in a case that the quantities of nodes in the two new network topologies are the same. Therefore, the quorum threshold may be obtained by dividing the first node quantity by 2. That is, the network topology succeeding in quorum requires at least a half of nodes in the original cluster. In this case, the quorum threshold may be represented by $N_Q(\text{Disk})$, where $$N_Q(\text{Disk}) = \frac{N_e}{2}.$$

Step 34: If there is not the quorum disk, dividing the first node quantity by 2, and adding 1 to a result to obtain the quorum threshold.

If there is not the quorum disk, it indicates that quorum may not be performed by contending for the quorum disk. In this case, quorum may be performed only by using the quantity of nodes. Therefore, the quantity of nodes in the network topology succeeding in quorum is required to be more than a half of the first node quantity. Therefore, the quorum threshold is obtained by dividing the first node quantity by 2 and adding 1 to a result. The quorum threshold may be represented by $N_Q(\text{Node})$, where $$N_Q(\text{Node}) = \frac{N_e}{2} + 1.$$

Specifically, in a possible implementation, the step of generating a quorum threshold by using the maximum single powered node quantity and the first node quantity according to a quorum disk condition of the historical election set may include the following steps.

Step 41: If there is the quorum disk in the historical election set, subtracting the maximum single powered node quantity from the first node quantity to obtain the quorum threshold.

When there is the quorum disk in the historical election set, it indicates that quorum may be completed by contending for the quorum disk. Therefore, the quantity of nodes in the network topology participating in quorum is required to be not less than a difference between the first node quantity and the maximum single powered node quantity. That is, in case of the topology loss, even if a power failure occurs on a power supply corresponding to the maximum single powered node quantity, remaining nodes may provide services as a cluster. In case of topology splitting, the two network topologies after splitting may contend for the quorum disk to further complete quorum even if including the same quantity of nodes. In this case, the quorum threshold may be represented by $N_Q(\text{Disk})$, where
$N_Q(\text{Disk})=N_e-N_p$.

$N_p$ is the maximum single powered node quantity.

Step 42: If there is not the quorum disk in the historical election set, subtracting the maximum single powering node quantity from the first node quantity, and adding 1 to a result to obtain the quorum threshold.

If there is not the quorum disk in the historical election set, it indicates that quorum may not be performed by contending for the quorum disk. Therefore, it is necessary to subtract the maximum single powered node quantity from the first node quantity, and add 1 to a result to obtain the quorum threshold. In this case, the quorum threshold may be represented by $N_Q(Node)$, where
$N_Q(Node)=N_e-N_p+1$.

S103: Acquiring a current network topology, and judging whether the current network topology satisfies the quorum parameter.

After the quorum parameter is determined, the current network topology is acquired, and whether the current network topology satisfies the quorum parameter is judged. The current network topology is a network topology in which the specified node is, and may specifically be any one of the two network topologies obtained by topology splitting, or a network topology including remaining nodes after the topology loss. After the current network topology is acquired, a quantity of second authorized nodes in the current network topology, the quorum disk condition, and the like may be determined, so as to subsequently judge whether the current network topology satisfies the quorum parameter. In the present embodiment, a specific judgment manner in which whether the current network topology satisfies the quorum parameter is judged is not limited. The specific judgment manner is related to the content of the quorum parameter. For example, when the quorum parameter includes the quorum threshold, whether the quantity of second authorized nodes in the current network topology is less than the quorum threshold may be judged. If the current network topology satisfies the quorum parameter, it indicates that the second authorized nodes in the current network topology may be combined to externally provide services as a new cluster. Therefore, step S104 is performed. If the current network topology does not satisfy the quorum parameter, step S105 may be performed.

Specifically, based on the descriptions in step S102, the step of judging whether the current network topology satisfies the quorum parameter may include the following steps.

Step 51: Judging whether a second authorized node quantity corresponding to the current network topology is less than the quorum threshold.

Step 52: If the second authorized node quantity corresponding to the current network topology is less than the quorum threshold, determining that the quorum parameter is not satisfied.

If the second authorized node quantity corresponding to the current network topology is less than the quorum threshold, it indicates that topology splitting currently occurs, and the current network topology obtained by splitting is a network topology including fewer nodes. Therefore, the current network topology cannot externally provide services as a new cluster, and it is determined that the current network topology does not satisfy the quorum parameter.

Step 53: If the second authorized node quantity corresponding to the current network topology is not less than the quorum threshold, judging whether the historical election set is a target election set.

It is to be noted that the target election set in the present embodiment is an election set with more than one power supply and the quorum disk or an election set with one power supply, an even quantity of first authorized nodes, and the quorum disk, When the historical election set is the target election set, the corresponding quorum threshold is represented by $N_Q(Node)$, and there is the quorum disk. Therefore, quorum may be required to be performed by using the quorum disk.

Step 54: If the historical election set is not the target election set, determining that the quorum parameter is satisfied.

If the historical election set is not the target election set, it indicates that quorum may not be performed by using the quorum disk and it is unnecessary to perform quorum by using the quorum disk. When the quantity of second authorized nodes in the current network topology, that is, the second authorized node quantity, is greater than the quorum threshold, it indicates that the current network topology includes more authorized nodes. Therefore, the quorum parameter is satisfied.

Step 55: If the historical election set is the target election set, judging whether the second authorized node quantity is equal to the quorum parameter.

Specifically, if the historical election set is the target election set, it indicates that quorum may be required to be performed by contending for the quorum disk. Therefore, whether there are enough second authorized nodes to avoid quorum performed by contending for the quorum disk is further judged. Therefore, whether the second authorized node quantity is less than the quorum threshold plus 1 is judged. That is, whether the second authorized node quantity is equal to the quorum threshold is judged because the second authorized node quantity is not less than the quorum threshold.

Step 56: If the second authorized node quantity is not equal to the quorum threshold, determining that the quorum parameter is satisfied.

If the second authorized node quantity is not equal to the quorum threshold, it indicates that the second authorized node quantity is greater than the quorum threshold, and it may be determined that the current network topology includes enough second authorized nodes. Therefore, it may be directly determined that the quorum parameter is satisfied, without contending for the quorum disk.

Step 57: If the second authorized node quantity is equal to the quorum threshold, judging, by using a current quorum disk condition of the current network topology, whether the quorum parameter is satisfied.

If the second authorized node quantity is equal to the quorum threshold, it indicates that the current network topology includes the same quantity of second authorized nodes as the other network topology, and whether the quorum parameter is satisfied is required to be judged by contending for the quorum disk.

Specifically, in an implementation, step 57 may include the following steps.

Step 61: If the current network topology recognizes the quorum disk, contending for the quorum disk, and determining, after successful contention, that the quorum parameter is satisfied.

Step 62: If the current network topology does not recognize the quorum disk, judging whether there is a quorum node.

Step 63: If there is the quorum node, determining that the quorum parameter is satisfied.

Step 64: If there is not the quorum node, determining that the quorum parameter is not satisfied.

In the present embodiment, if recognizing the quorum disk, the current network topology may perform an operation of contending for the quorum disk, that is, contend with the other network topology for a permission to write the quorum disk. After successful contention, it may be determined that the current network topology satisfies the quorum parameter. If the current network topology cannot recognize the quorum disk, quorum may be performed in a manner like contending for the quorum disk. Specifically, whether there is the quorum disk in the current network topology may be judged. The quorum node is specifically a node with a minimum ID in first authorized nodes in a non-leaving state. If all the first authorized nodes are in a leaving state, the quorum node is a node with a minimum ID in all the first authorized nodes. Specifically, the leaving state means that the first authorized node is to be controlled to be off-line, for example, be off-line after a next round of calculation, for maintenance. Since a master node in the cluster is usually an authorized node with a minimum ID, if the master node is a leaving node, quorum is required to be performed again after the master node is off-line. Therefore, the quorum node is specifically the node with the minimum ID in the first authorized nodes in the non-leaving state. If all the first authorized nodes are in the leaving state, the quorum node is determined to be the node with the minimum ID in all the first authorized nodes in a conventional manner. Therefore, when there is the quorum node in the current network topology, that is, when there is a node capable of serving as the master node in the cluster, it is determined that the current network topology satisfies the quorum parameter.

S104: Providing a cluster service.

If the current network topology satisfies the quorum parameter, it indicates that the current network topology may externally provide services as a new cluster. Therefore, after it is determined that the current network topology satisfies the quorum parameter, the cluster service is provided by using the current network topology. Specific manner in which the cluster service is provided is not limited. For example, initialization or another operation is required to be performed, and after initialization, the current network topology externally provides services as a new cluster.

S105: Performing a preset operation.

If the current network topology does not satisfy the quorum parameter, it indicates that the current network topology is unable to externally provide services as a new cluster. Meanwhile, topology splitting occurs, and the other network topology obtained by splitting is able to externally provide services as a new cluster. In this case, the preset operation may be performed. Specific content of the preset operation is not limited. For example, each node in the current network topology may be controlled to be off-line or leave the original cluster.

With application of the cluster quorum method provided in the embodiment of the present application, after a splitting or loss failure occurs on a network topology of a cluster, a first node quantity and a power condition that correspond to a historical election set before the splitting or loss failure are acquired, and quorum is performed by using the first node quantity and power condition to judge whether a network topology after the failure can continue to provide services as a cluster. Specifically, a quorum parameter is generated by using the first node quantity. A quantity of nodes in the network topology after the failure may be limited based on an original quantity of nodes, to ensure that there is and is only one new network topology capable of externally providing services as a cluster if network topology splitting occurs and prevent data inconsistency caused by the fact that two clusters externally provide services at the same time. In addition, it can be ensured that when there is only one network topology after the topology loss occurs, nodes in the network topology can externally provide services as a new cluster. After the quorum parameter is obtained, whether the current network topology satisfies the quorum parameter is judged. If the current network topology satisfies the quorum parameter, a cluster service can be externally provided, such that the cluster continues to work. According to the method, the new network topology after the failure is not required to include the majority of nodes in the original cluster, whereby the network topology can continue to work no matter a quantity of nodes in the network topology while data consistency is ensured, improving viability of the cluster.

The following describes a cluster quorum apparatus provided in the embodiments of the present application. The cluster quorum apparatus described below and the cluster quorum method described above may correspondingly refer to each other.

Figure 2:
FIG. 2 is a schematic diagram of a structure of a cluster quorum apparatus according to an embodiment of the present application.

Refer to FIG. 2. FIG. 2 is a schematic diagram of a structure of a cluster quorum apparatus according to an embodiment of the present application, including:

an acquisition module 110, configured to acquire a historical election set, and obtain a first node quantity and a power condition by using the historical election set;

a generation module 120, configured to generate a quorum parameter by using the first node quantity according to the power condition;

a judgment module 130, configured to acquire a current network topology, and judge whether the current network topology satisfies the quorum parameter; and a service module 140, configured, if the current network topology satisfies the quorum parameter, to provide a cluster service.

In some embodiments, the acquisition module 110 includes:

a statistics unit, configured to collect statistics on a first authorized node in the historical election set to obtain the first node quantity;

a powering judgment unit, configured to acquire power information corresponding to each first authorized node, and judge whether all first authorized nodes are powered by a single power supply; and a single powering unit, configured, if all the first authorized nodes are powered by the single power supply, to determine the power condition to be single powering; or a maximum single powered node quantity determining unit, configured, if not all the first authorized nodes are powered by the single power supply, to determine the power condition to be a maximum single powered node quantity, the maximum single powered node quantity being greater than a half of the first node quantity.

In some embodiments, the generation module 120 includes:

a first quorum threshold generation unit, configured, if the power condition is single powering, to generate a quorum threshold by using the first node quantity according to a parity condition of the first node quantity; or a second quorum threshold generation unit, configured, if the power condition is the maximum single powered node quantity, to generate a quorum threshold by using the maximum single powered node quantity and the first node quantity according to a quorum disk condition of the historical election set; and a quorum parameter generation unit, configured to generate the quorum parameter by using the quorum threshold.

In some embodiments, the first quorum threshold generation unit includes:

a first calculation subunit, configured, if the first node quantity is odd, to add 1 to the first node quantity, and divide a result by 2 to obtain the quorum threshold; or a judgment subunit, configured, if the first node quantity is even, to judge whether there is a quorum disk in the historical election set, and a second calculation subunit, configured, if there is the quorum disk in the historical election set, to divide the first node quantity by 2 to obtain the quorum threshold, or a third calculation subunit, configured, if there is not the quorum disk in the historical election set, to divide the first node quantity by 2, and add 1 to a result to obtain the quorum threshold.

In some embodiments, the second quorum threshold generation unit includes:

a fourth calculation subunit, configured, if there is a quorum disk in the historical election set, to subtract the maximum single powered node quantity from the first node quantity to obtain the quorum threshold; or a fifth calculation subunit, configured, if there is not a quorum disk in the historical election set, to subtract the maximum single powered node quantity from the first node quantity, and add 1 to a result to obtain the quorum threshold.

In some embodiments, the judgment module 130 includes:

a first judgment unit, configured to judge whether a second authorized node quantity corresponding to the current network topology is less than the quorum threshold; and a first determining unit, configured, if the second authorized node quantity corresponding to the current network topology is less than the quorum threshold, to determine that the quorum parameter is not satisfied; or a target election set judgment unit, configured, if the second authorized node quantity corresponding to the current network topology is not less than the quorum threshold, to judge whether the historical election set is a target election set, the target election set being an election set with more than one power supply and the quorum disk or an election set with one power supply, an even quantity of first authorized nodes, and the quorum disk, a second determining unit, configured, if the historical election set is not the target election set, to determine that the quorum parameter is satisfied, or a second judgment unit, configured, if the historical election set is the target election set, to judge whether the second authorized node quantity is equal to the quorum parameter, and a third determining unit, configured, if the second authorized node quantity is not equal to the quorum threshold, to determine that the quorum parameter is satisfied, or a quorum disk judgment unit, configured, if the second authorized node quantity is equal to the quorum threshold, to judge, by using a current quorum disk condition of the current network topology, whether the quorum parameter is satisfied.

In some embodiments, the quorum disk judgment unit includes:

a contention subunit, configured, if the current network topology recognizes the quorum disk, to contend for the quorum disk, and determine, after successful contention, that the quorum parameter is satisfied; or a quorum node judgment subunit, configured, if the current network topology does not recognize the quorum disk, to judge whether there is a quorum node, and a satisfaction determining subunit, configured, if there is the quorum node, to determine that the quorum parameter is satisfied, or a dissatisfaction determining subunit, configured, if there is not the quorum node, to determine that the quorum parameter is not satisfied.

The following describes an electronic device provided in the embodiments of the present application. The electronic device described below and the cluster quorum method described above may correspondingly refer to each other.

Figure 3:
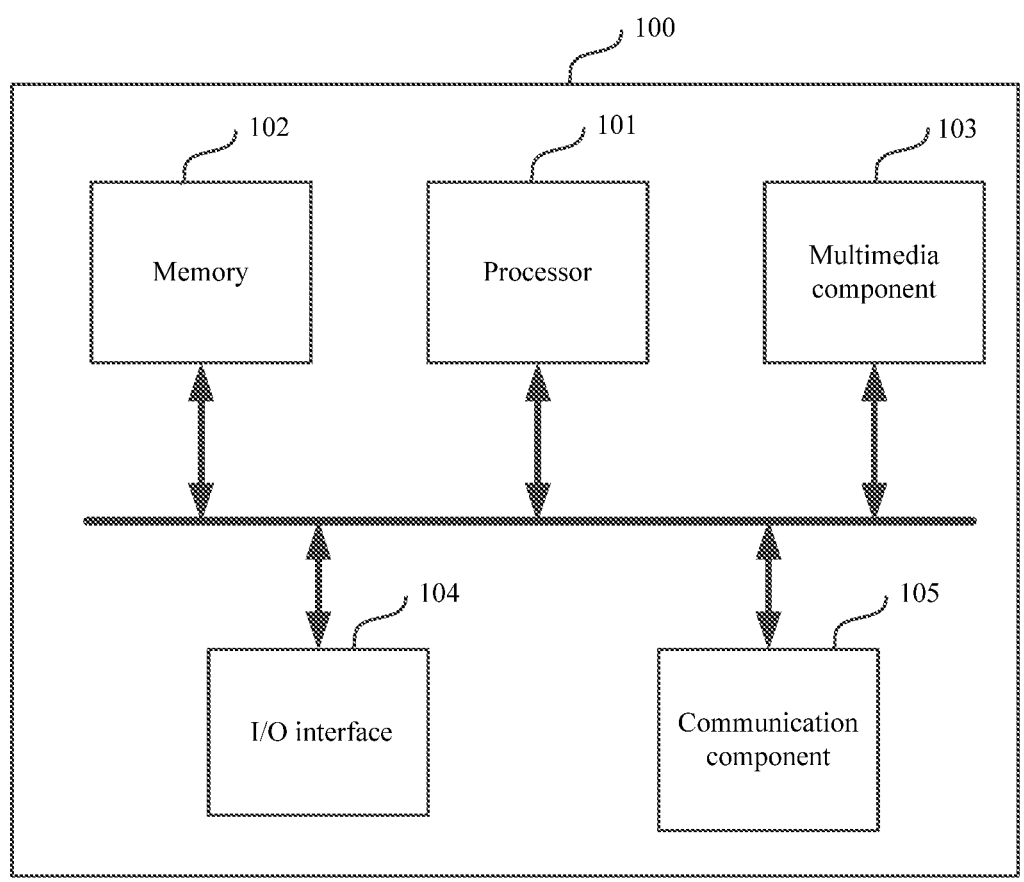
FIG. 3 is a schematic diagram of a structure of an electronic device according to an embodiment of the present application.

Refer to FIG. 3. FIG. 3 is a schematic diagram of a structure of an electronic device according to an embodiment of the present application. The electronic device 100 may include a processor 101 and a memory 102, and may further include one or more of a multimedia component 103, an information Input/Output (I/O) interface 104, and a communication component 105.

The processor 101 is configured to control overall operations of the electronic device 100, so as to complete all or some steps in the cluster quorum method. The memory 102 is configured to store various types of data so as to support operations on the electronic device 100. For example, the data may include instructions for any application program or method operated on the electronic device 100, as well as data related to the application program. The memory 102 may be implemented by any type of volatile or non-volatile storage device or a combination thereof, for example, one or more of a Static Random Access Memory (SRAM), an Electrically Erasable Programmable Read-Only Memory (EEPROM), an Erasable Programmable Read-Only Memory (EPROM), a Programmable Read-Only Memory (PROM), a Read-Only Memory (ROM), a magnetic memory, a flash memory, a magnetic disk, or an optical disk.

The multimedia component 103 may include a screen and an audio component. The screen may be, for example, a touch screen. The audio component is configured to output and/or input an audio signal. For example, the audio component may include a microphone configured to receive an external audio signal. The received audio signal may further be stored in the memory 102 or sent by the communication component 105. The audio component further includes at least one speaker configured to output an audio signal. The I/O interface 104 provides an interface between the processor 101 and another interface module such as a keyboard, a mouse, or a button. The button may be a virtual button or a physical button. The communication component 105 is configured for wired or wireless communication between the electronic device 100 and another device. Wireless communication is, for example, Wireless Fidelity (Wi-Fi), Bluetooth, Near Field Communication (NFC), 2nd-Generation (2G), 3rd-Generation (3G), 4th-Generation (4G), or a combination thereof. Therefore, the communication component 105 may correspondingly include a Wi-Fi component, a Bluetooth component, and an NFC component.

The electronic device 100 may be implemented by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), controllers, micro-controllers, microprocessors, or other electronic components, to perform the cluster quorum method provided in the foregoing embodiments.

The following describes a computer-readable storage medium provided in the embodiments of the present application. The computer-readable storage medium described below and the cluster quorum method described above may correspondingly refer to each other.

The present application also provides a computer-readable storage medium. The computer-readable storage medium stores a computer program. The computer program is executed by a processor to implement the steps of the foregoing cluster quorum method.

The computer-readable storage medium may include various media capable of storing program code, such as a U disk, a mobile hard disk, a ROM, a Random Access Memory (RAM), a magnetic disk, or an optical disk.

Each embodiment in the description is described progressively. Descriptions made in each embodiment focus on differences from the other embodiments, and the same or similar parts in each embodiment refer to the other embodiments. The apparatus disclosed in the embodiments corresponds to the method disclosed in the embodiments, and thus is described briefly, and related parts refer to the descriptions about the method.

Those skilled in the art may further realize that the units and the algorithm steps in each example described with reference to the embodiments disclosed herein may be implemented by electronic hardware, computer software, or a combination thereof. For clarity of description about the exchangeability of hardware and software, the compositions and the steps in each example have been generally described in the foregoing description according to functions. Whether these functions are executed by hardware or software depends on specific applications and design constraints of the technical solutions. Those skilled in the art may use different methods to implement the described functions for each particular application, but it should not be considered that the implementation goes beyond the scope of the present application.

The steps of the method or algorithm described with reference to the embodiments disclosed herein may directly be implemented by hardware, a software module executed by the processor, or a combination thereof. The software module may be arranged in a RAM, an internal memory, a ROM, an electrically programmable ROM, an EEPROM, a register, a hard disk, a removable disk, a Compact Disc Read-Only Memory (CD-ROM), or a storage medium in any other form well known in this art.

It is finally to be noted that relational terms herein, such as first and second, are only for distinguishing one entity or operation from another and do not necessarily require or imply the existence of any practical relation or sequence between these entities or operations. Moreover, terms "include" and "contain" or any other variation thereof is intended to cover nonexclusive inclusions, so that a process, a method, an object, or a device that includes a series of elements includes not only those elements but also other elements that are not clearly listed, or further includes elements intrinsic to the process, the method, the object, or the device.

The principle and implementations of the present application are described with specific examples herein. The above descriptions about the embodiments are only used to help understand the method of the present application and the core concept thereof. In addition, those ordinarily skilled in the art may make variations to the specific implementations and the application scope according to the concept of the present application. In summary, the content of the description should not be understood as a limitation on the present application.

What is claimed is:

1. A cluster quorum method, comprising:
    acquiring a historical election set, and obtaining a first node quantity and a power condition by using the historical election set;
    generating a quorum parameter by using the first node quantity according to the power condition;
    acquiring a current network topology, and judging whether the current network topology satisfies the quorum parameter; and
    in response to the current network topology satisfying the quorum parameter, providing a cluster service.

2. The cluster quorum method according to claim 1, wherein the obtaining a first node quantity and a power condition by using the historical election set comprises:
    collecting statistics on a first authorized node in the historical election set to obtain the first node quantity;
    acquiring power information corresponding to each first authorized node, and judging whether all first authorized nodes are powered by a single power supply; and
    in response to all the first authorized nodes being powered by the single power supply, determining the power condition to be single powering; or
    in response to not all the first authorized nodes being powered by the single power supply, determining the power condition to be a maximum single powered node quantity, the maximum single powered node quantity being greater than a half of the first node quantity.

3. The cluster quorum method according to claim 2, wherein the generating a quorum parameter by using the first node quantity according to the power condition comprises:
    in response to the power condition being single powering, generating a quorum threshold by using the first node quantity according to a parity condition of the first node quantity; or
    in response to the power condition being the maximum single powered node quantity, generating a quorum threshold by using the maximum single powered node quantity and the first node quantity according to a quorum disk condition of the historical election set; and
    generating the quorum parameter by using the quorum threshold.

4. The cluster quorum method according to claim 3, wherein the generating a quorum threshold by using the first node quantity according to a parity condition of the first node quantity comprises:
    in response to the first node quantity being odd, adding 1 to the first node quantity, and dividing a result by 2 to obtain the quorum threshold; or
    in response to the first node quantity being even, judging whether there is a quorum disk in the historical election set, and
    in response to there being the quorum disk in the historical election set, dividing the first node quantity by 2 to obtain the quorum threshold, or
    in response to there not being the quorum disk in the historical election set, dividing the first node quantity by 2, and adding 1 to a result to obtain the quorum threshold.

5. The cluster quorum method according to claim 3, wherein the generating a quorum threshold by using the maximum single powered node quantity and the first node quantity according to a quorum disk condition of the historical election set comprises:
    in response to there being a quorum disk in the historical election set, subtracting the maximum single powered node quantity from the first node quantity to obtain the quorum threshold; or in response to there not being a quorum disk in the historical election set, subtracting the maximum single powered node quantity from the first node quantity, and adding 1 to a result to obtain the quorum threshold.

6. The cluster quorum method according to claims 3 wherein the judging whether the current network topology satisfies the quorum parameter comprises:
    judging whether a second authorized node quantity corresponding to the current network topology is less than the quorum threshold; and
    in response to the second authorized node quantity corresponding to the current network topology being less than the quorum threshold, determining that the quorum parameter is not satisfied; or
    in response to the second authorized node quantity corresponding to the current network topology being not less than the quorum threshold, judging whether the historical election set is a target election set, the target election set being an election set with more than one power supply and the quorum disk or an election set with one power supply, an even quantity of first authorized nodes, and the quorum disk,
    in response to the historical election set not being the target election set, determining that the quorum parameter is satisfied, or
    in response to the historical election set being the target election set, judging whether the second authorized node quantity is equal to the quorum parameter, and
    in response to the second authorized node quantity being not equal to the quorum threshold, determining that the quorum parameter is satisfied, or
    in response to the second authorized node quantity being equal to the quorum threshold, judging, by using a current quorum disk condition of the current network topology, whether the quorum parameter is satisfied.

7. The cluster quorum method according to claim 6, wherein the judging, by using a current quorum disk condition of the current network topology, whether the quorum parameter is satisfied comprises:
    in response to the current network topology recognizing the quorum disk, contending for the quorum disk, and determining, after successful contention, that the quorum parameter is satisfied; or
    in response to the current network topology not recognizing the quorum disk, judging whether there is a quorum node, and
    in response to there being the quorum node, determining that the quorum parameter is satisfied, or
    in response to there not being the quorum node, determining that the quorum parameter is not satisfied.

8. The cluster quorum method according to claim 7, wherein the contending for the quorum disk comprises:
    contending with an other network topology for a permission to write the quorum disk.

9. The cluster quorum method according to claim 7, wherein the quorum node is a node with a minimum ID in all of the first authorized nodes in response to the all the first authorized nodes being in a leaving state.

10. The cluster quorum method according to claim 9, wherein the leaving state is a state that the first authorized node is to be controlled to be off-line.

11. The cluster quorum method according to claim 2, wherein the power information is used to represent an identity of a power supply that powers the first authorized node.

12. The cluster quorum method according to claim 11, wherein the power information is a power supply Identifier or a power supply name.

13. The cluster quorum method according to claim 2, wherein the maximum single powered node quantity is a maximum quantity of nodes powered by a same power supply.

14. The cluster quorum method according to claim 1, wherein the historical election set is a set including an authorized node in the cluster in response to the cluster providing services as a cluster before the network failure.

15. The cluster quorum method according to claim 1, wherein the current network topology is any one of two network topologies obtained by topology splitting, or a network topology including remaining nodes after a topology loss.

16. The cluster quorum method according to claim 1, further comprising:
    in response to the current network topology not satisfying the quorum parameter, performing a preset operation.

17. The cluster quorum method according to claim 16, wherein the preset operation comprises:
    controlling each node in the current network topology to be off-line or leave the original cluster.

18. The cluster quorum method according to claim 1, wherein the historical election set is to be stored on each node in the cluster or on each authorized node.

19. An electronic device, comprising:
    a memory and a processor, wherein
    the memory is storing a computer program; and
    the processor upon execution of the computer program is configured to: implement
    acquire a historical election set, and obtain a first node quantity and a power condition by using the historical election set;
    generate a quorum parameter by using the first node quantity according to the power condition;
    acquire a current network topology, and judge whether the current network topology satisfies the quorum parameter; and
    in response to the current network topology satisfying the quorum parameter, provide a cluster service.

20. A non-transitory computer-readable storage medium, storing a computer program executable by a processor, wherein the computer program, when executed by the processor, is configured to cause the processor to:
    acquire a historical election set, and obtain a first node quantity and a power condition by using the historical election set;
    generate a quorum parameter by using the first node quantity according to the power condition;
    acquire a current network topology, and judge whether the current network topology satisfies the quorum parameter; and
    in response to the current network topology satisfying the quorum parameter, provide a cluster service.

* * * * *